United States Patent [19]

Surrall et al.

[11] 3,845,545
[45] Nov. 5, 1974

[54] METHOD FOR MAKING REGENERATIVE HEAT-EXCHANGER SEALS

[75] Inventors: Alan John Surrall, Studley; Peter Philip Candlin, Solihull, both of England

[73] Assignee: British Leyland Truck and Bus Division Limited, Lancashire, England

[22] Filed: Aug. 14, 1972

[21] Appl. No.: 280,556

[30] Foreign Application Priority Data
Sept. 21, 1971  Great Britain .................... 43916/71

[52] U.S. Cl............. 29/494, 29/157.3 R, 29/497.5, 29/498, 29/DIG. 34, 277/96
[51] Int. Cl........................................... B23k 31/02
[58] Field of Search........ 29/157.3 R, 156.8 R, 481, 29/488, 494, 473.1, 472.9, 497.5, 498, DIG. 34; 277/96

[56] References Cited
UNITED STATES PATENTS

| | | | |
|---|---|---|---|
| 2,945,295 | 7/1960 | Feaster | 29/494 |
| 2,957,239 | 10/1960 | Pritchard et al. | 29/494 X |
| 3,271,852 | 9/1966 | Lang | 29/494 |
| 3,391,447 | 7/1968 | Ard | 29/473.1 |
| 3,394,451 | 7/1968 | Stuart | 29/481 X |
| 3,667,110 | 6/1972 | Gwyn, Jr. | 29/494 |
| 3,730,538 | 5/1973 | Silverstone | 277/96 |

*Primary Examiner*—J. Spencer Overholser
*Assistant Examiner*—Robert J. Craig
*Attorney, Agent, or Firm*—Brisebois & Kruger

[57] ABSTRACT

A method of manufacturing a counterface hot-side seal for a rotary disc-type matrix of a regenerative heat-exchanger comprises: forming a composite structure, consisting of a counterface element and a heat-resistant support pad, by preforming the counterface element as highly-compacted blocks and chemically treating the surface thereof which is to mate with the support pad, to produce a metallic layer on that surface; brazing the counterface element to the support pad in an inert atmosphere (e.g. argon or nitrogen); and lapping the counterface to achieve the requisite flatness.

5 Claims, 3 Drawing Figures

PATENTED NOV 5 1974    3,845,545

METHOD FOR MAKING REGENERATIVE HEAT-EXCHANGER SEALS

This invention relates to seals for regenerative heat-exchangers of the kind employing a rotary disc-type matrix.

Regenerative heat-exchangers of the kind referred to are usually incorporated in gas turbine power plants to extract heat from the exhaust gases, and to transfer it to the compressed intake-air before this enters the combustion chamber of the gas turbine engine. The rotary disc-type matrix, which is housed in the casing of the engine, normally comprises a foraminous refractory core of ceramic or glass-ceramic material formed with a multitude of fluid-flow ducts. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zones, occupied by the compressed intake-air, and the low-pressure zones occupied by the exhaust gases. The air and exhaust gas flow through the heat-exchanger disc in opposite directions such that the cold air enters the disc adjacent to the exit of the cooled exhaust gas. This face of the disc, embracing both air entry and gas exit sectors, is commonly designated the "cold side." Similarly, the hot exhaust gas enters the disc adjacent to the exit of the heated air. This face of the disc, embracing both gas entry and air exit sectors, is commonly designated the "hot side."

To effect segregation of the air and exhaust gas, it is common practice to employ counterface seals that make rubbing contact with the respective faces of the matrix, the hot-side seals being of high-temperature material.

The counterface material employed for the hot-side seals of ceramic regenerative heat-exchangers is normally nickel oxide, which is either flame-sprayed or plasma-sprayed onto the counterface support pad of the seal. The disadvantages of this method are that considerable time is required to build up an adequate deposit; the adhesion to the substrate is never as high as is desirable; and the wastage of costly material is high.

According to this invention an improved method of manufacturing a counterface hot-side seal for a rotary disc-type matrix of a regenerative heat-exchanger comprises: forming a composite structure, consisting of a counterface element and a heat-resistant support pad, by preforming the counterface element as highly-compacted blocks and chemically treating the surface thereof which is to mate with the support pad, to produce a metallic layer on that surface; brazing the counterface element to the support pad in an inert atmosphere; and lapping the counterface to achieve the requisite flatness.

By means of the invention, the following advantages over use of flame-spraying or plasma-spraying techniques can be achieved:

a. An economy in the amount of material consumed is effected, due to the use of highly-compacted blocks instead of sprayed powder.

b. The strength of the bond between the counterface element and its support pad is increased very considerably.

c. Greater working thickness of the counterface element is possible.

d. A higher degree of quality control is possible with this process.

Referring to the accompanying schematic drawings.

Figure 2:
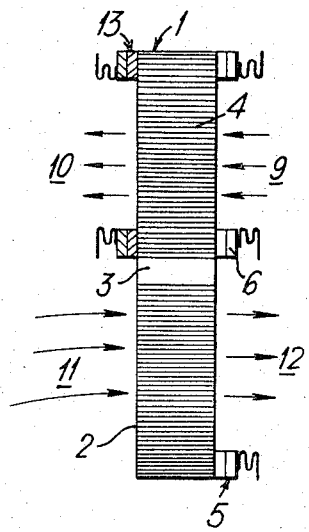
FIG. 2 is a section on the line II—II in FIG. 1.

A regenerative heat-exchanger 1 has a rotary disc-type matrix 2 mounted on a central bearing 3. The matrix 2, which is housed in a casing (not shown) of a gas turbine engine, comprises a foraminous annular refractory core of ceramic or glass-ceramic material formed with a multitude of fluid-flow ducts 4 (FIG. 2) that lie substantially parallel to the axis of rotation.

Figure 1:
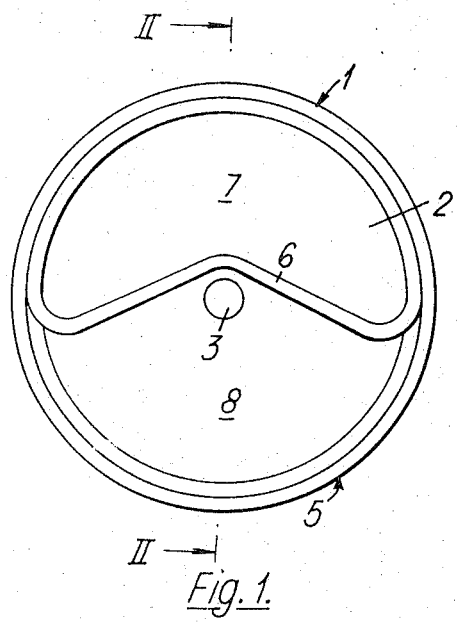
FIG. 1 is an axial view of a rotary disc-type matrix of a regenerative heat-exchanger having a counterface hot-side seal manufactured by the method according to the invention.

By means of confluent outer and inner seals 5 and 6 respectively, sector-like zones 7 and 8 (FIG. 1) of the matrix 2 are caused (by its rotation) to be presented alternately to the flow of hot exhaust gas and to the flow of the compressed intake-air. The hot exhaust gas enters the matrix 2 at zone 9 (FIG. 2), and the cooled exhaust gas leaves the matrix at zone 10. The compressed intake-air enters the matrix 2 at zone 11, and leaves it at zone 12 after having been heated to a high temperature. Zones 9 and 12 constitute the hot side of the matrix 2, and zones 10 and 11 constitute its cold side. Zone 10 is bounded by a counterface seal 13 that conforms to the shape of the sector-like zone 7 (FIG. 1).

Figure 3:
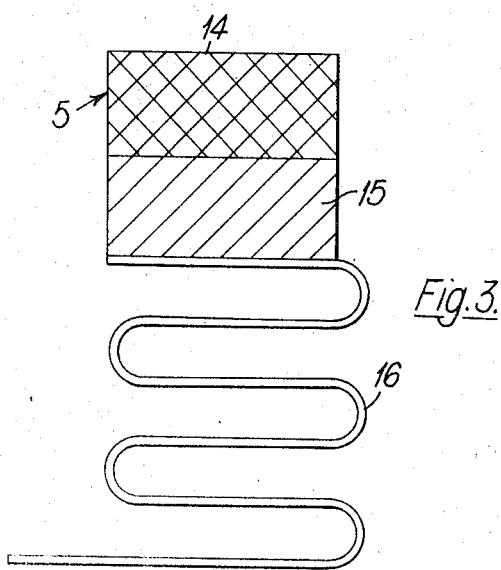
FIG. 3 is an enlarged cross-sectional view of the hot-side seal.

Referring to FIG. 3, the hot-side seal 5 comprises a preformed counterface element 14 and a heat-resistant support pad 15, the latter being attached to a metal bellows 16 mounted on the engine casing. The support pad 15 is made of mild steel, but any other ferritic material could be substituted for it.

The preformed counterface element 14, which can be produced in known manner as highly-compacted blocks, may, for example, be sintered nickel oxide blocks having a thickness of from 0.125 inch to 0.5 inch, but 0.25 inch is a typical value.

That surface of the counterface element 14 which is to mate with the support pad 15 is reduced to nickel by the application of a solution of sodium hypophosphite and formic acid in methanol, and this chemical treatment is followed by a heat treatment at approximately 200°C.

A paste of brazing powder and flux is applied to the mating faces of the counterface element 14 and the support pad 15; and the assembly is raised to brazing temperature in an inert atmosphere, e.g. argon or nitrogen.

An alternative method of treating the mating surfaces of the counterface element 14 and the support pad 15 is to use a reactive flux mixed with the brazing filler metal. Such a flux, containing sodium fluoride and nickel phosphate when used at about 50 percent by weight of the filler metal flux mixture, will produce sufficiently active surfaces on both the mild steel and the nickel oxide to permit a braze to take place. The process uses the temperature recommended for the filler metal and must be performed in an inert atmosphere, e.g. argon or nitrogen. Cooling from braze temperature may be rapid, and air can be substituted for the inert gas below 800°C.

The hot-side seal produced by either of the methods described above is finished by lapping the counterface element 14 to achieve the requisite flatness.

We claim:

1. A method of manufacturing a counterface hot-side seal for a rotary disc-type matrix of a regenerative heat-exchanger for use in a gas turbine engine, which method comprises:
    a. providing a ferritic support member;
    b. forming a counterface element from a metal oxide in compacted block form;
    c. reducing a surface of said metal oxide element to its metal;
    d. heat treating the said surface;
    e. applying a paste of brazing powder and flux to said surface and to a surface of said ferritic support member;
    f. bringing said two surfaces together and raising the assembly so formed to a brazing temperature in an inert atmosphere and thereby brazing the counterface element to the support member; and
    g. lapping a surface of said counterface element opposite to said first mentioned surface to a requisite flatness for it to serve as a counterface seal.

2. A method of manufacturing a counterface hot-side seal for a rotary disc-type matrix of a regenerative heat-exchanger for use in a gas turbine engine, which method comprises:
    a. providing a ferritic support member;
    b. forming a counterface element from a nickel oxide;
    c. applying a solution of sodium hypophosphate and formic acid to a surface of the nickel oxide to reduce it;
    d. heat treating the nickel surface so produced at approximately 200°C;
    e. applying a paste of brazing powder and flux to said surface and to a surface of said ferritic support member; and
    f. bringing said two surfaces together and raising the assembly so formed to a brazing temperature in an inert atmosphere and thereby brazing the counterface element to the support member.

3. A method as claimed in claim 2 in which nickel oxide is sintered into a highly compacted block to form said counterface element.

4. A method of manufacturing a counterface hot-side seal for a rotary disc-type matrix of a regenerative heat-exchanger for use in a gas turbine engine, which method comprises:
    a. providing a ferritic support member;
    b. forming a counterface element from nickel oxide;
    c. applying a brazing filler metal and a reactive flux to a surface of said support member and to a surface of said nickel oxide support member, said reactive flux containing sodium fluoride and nickel phosphate in an amount equal to approximately 50 percent by weight of the mixture of the brazing filler metal and the flux; and
    d. bringing said two surfaces together and raising the assembly so formed to a brazing temperature in an inert atmosphere.

5. A method as claimed in claim 2 in which a surface of said counterface element opposite to said first mentioned surface is then lapped to a flatness enabling it to serve as a counterface seal.

* * * * *